(12) United States Patent
Galvanauskas et al.

(10) Patent No.: US 6,344,921 B1
(45) Date of Patent: Feb. 5, 2002

(54) OPTICAL PARAMETRIC AMPLIFIERS AND GENERATORS IN OPTICAL COMMUNICATION SYSTEMS

(76) Inventors: Almantas Galvanauskas, 4968 Ravine Ct.; Donald J. Harter, 3535 Sulgrave Pl.; Ka K. Wong, 1385 Folkstone Ct.; Martin E. Fermann, 4931 Ravine Ct., all of Ann Arbor, MI (US) 48105

(*) Notice: Subject to any disclaimer, the term of this patent is extended or adjusted under 35 U.S.C. 154(b) by 0 days.

(21) Appl. No.: 09/253,949

(22) Filed: Feb. 22, 1999

(51) Int. Cl.[7] .............................. G02F 1/365; G02F 1/39
(52) U.S. Cl. ...................... 359/332; 359/328; 359/330; 359/333
(58) Field of Search ................... 359/326–332, 359/333, 341–344, 346

(56) References Cited

U.S. PATENT DOCUMENTS

| | | | |
|---|---|---|---|
| 3,660,673 A | * 5/1972 | Anderson | 359/330 |
| 3,875,422 A | * 4/1975 | Stolen | 359/330 |
| 5,274,495 A | * 12/1993 | Shirasaki | 359/330 |
| 5,309,275 A | * 5/1994 | Nishimura et al. | 359/344 |
| 5,321,540 A | 6/1994 | Takai et al. | 359/124 |
| 5,434,700 A | 7/1995 | Yoo | 359/332 |
| 5,510,921 A | 4/1996 | Takai et al. | 359/124 |
| 5,786,916 A | 7/1998 | Okayama et al. | 359/128 |
| 5,825,517 A | 10/1998 | Antoniades et al. | 359/117 |

OTHER PUBLICATIONS

M.L. Bortz et al, "Quasi–Phase–Matched Optical Parametric Amplification and Oscillation in Periodically Poled LiNbO3 Waveguides", OPTICS LETTERS, vol. 20, No. 1, Jan. 1, 1995, pp. 49–51.*
Sten Helmfrid, et al, Journal of Lightwave Technology, vol. 11, No. 9, Sep., 1993, Optical Parametric Amplification of a 1.54–$\mu$m Single–Mode DFB Laser in a Ti:LiNbO$_3$ Waveguide, pp. 1459–1469.
M.H. Chou, et al, "1.5$\mu$m–Band Wavelength Conversion Based on Difference–Frequency Generation in LiNbO$_3$ Waveguides with Integrated Coupling Structures", Optics Letters, vol. 23, No. 13, Jul. 1, 1998, pp. 1004–1006.

* cited by examiner

*Primary Examiner*—John D. Lee
(74) *Attorney, Agent, or Firm*—Sughrue Mion, PLLC

(57) ABSTRACT

A high gain optical parametric amplifier is implemented in a LiNbO$_3$ waveguide fabricated by a combination of periodic electric field poling and proton exchange techniques. The device is capable of amplification in the whole transmission window of silica optical fibers with gains up to 90 dB. The high nonlinearity and resultant high gain of the waveguide-amplifier permits the use of essentially standard power (milliwatt to 10 watt) fiber laser pump sources.

14 Claims, 22 Drawing Sheets

OPTICAL PARAMETRIC AMPLIFIERS AND GENERATORS IN OPTICAL COMMUNICATION SYSTEMS

BACKGROUND OF THE INVENTION

1. Field of the Invention

The invention generally relates to optical communication systems, and, in particular, to the use of three-wave optical parametric amplification for optical signal amplification in fiber-optic communication systems.

2. Description of the Prior Art—General

Owing to large frequency-bandwidth capacity, which is characteristic to both optical fiber and optical signals, fiber-optic technology provides the means for transmitting large volumes of information at very high speeds (high-bit-rate data transmission). The current generation of fiber-optic (lightwave) communication systems is based on the use of optical amplification and wavelength-division multiplexing (WDM). Optical amplification is used to increase signal propagation distance, which, otherwise, would be limited by optical losses in a transmitting fiber. WDM is used to increase the number of communication channels transmitted through the fiber, to increase the bit rate. In WDM systems each communication channel is assigned its own frequency band, characterized by a unique carrier frequency and spectral width. The bit rate of the data transmitted through a single fiber is thus proportional to the number of channels created in this fiber.

Two main factors that limit the number of channels are the spectral bandwidth provided by current optical amplifiers and the ultimate spectral separation between channels. The channel density cannot be infinitely high due to findamental limitations arising from nonlinear effects in the fiber and the signal modulation bandwidths used to encode the transmitted data. Current channel spacing is 50–100 GHz (corresponding to 0.4–0.8 nm at a 1550 nm communication window) and is not expected to be significantly improved beyond this level. The maximum potential bandwidth of Erbium doped fiber amplifiers, which are currently standard in communication systems, is only approximately 80 nm, limited by active-ion and glass-host spectroscopic properties. This sets the maximum limit of WDM channels potentially available in currently existing communication systems to 100–200.

However, ideally, one would wish to utilize the full spectral bandwidth available in the fiber in order to achieve the maximum number of WDM channels and, consequently, the highest bit rates in fiber communication systems. This available bandwidth usually corresponds to the spectral region where the optical attenuation in the optical fiber is at its minimum. For currently standard silica-based fibers this comprises the wavelength range between approximately 1.2 to 1.7 $\mu$m. This broad bandwidth is unattainable with any known rare-earth doped fiber amplifier, including Er-doped fiber amplifiers. This is illustrated in FIG. 1, where the loss curve for silica fibers and approximate wavelength ranges for the gain spectra of the known rare-earth fibers are shown.

In optical fibers based on other types of optical glasses (eg. ZBLA—zirconium-barium-lanthanum-aluminum fluoride glass) optical losses can be significantly smaller, and spectral bandwidths broader, than in silica fibers, as shown in FIG. 2. The absence of suitable optical amplification sources is one of the main obstacles to the use of these broad-bandwidth and low-loss fibers in communication systems.

New types of optical amplifiers are necessary for optical communication systems, to enable full access to the broad spectral bandwidths available in optical fibers.

The ability to change the wavelength of a transmitted optical signal is a necessary function for WDM communication systems. WDM communication systems constitute networks of certain topologies, where communication lines are interconnected at network nodes. Wavelength switching allows redirection of information between different WDM channels and provides the necessary flexibility and interconnectivity of the communication network. Currently, this function is implemented separately from the optical amplification system and, thus, adversely affects the cost of the communications system.

Significant transmission-rate limitations in current communication systems arise from pulse spreading due to group-velocity dispersion (GVD) in a single-mode optical fiber. Various passive dispersion-compensating devices have been proposed, including fiber-gratings, dual-mode fibers, dispersion-compensating fibers, etc. Integration of the functions of dispersion-compensation, broadband optical amplification and wavelength switching into a single device would bring significant advantages in reducing the overall complexity and cost of optical communication systems.

3. Discussion of Known Relevant Prior Art

The use of three-wave optical parametric amplification for optical signal amplification in fiber-optic communication systems was first described by Helmfrid et al, "Optical Parametric Amplification of a 1.54 $\mu$m Single-Mode DFB Laser in a Ti:LiNbO$_3$ Waveguide, Journal of Lightwave Technology, Vol. 11, No. 9 (1993). This system did not achieve gain sufficient to be of practical use, although the publications predicts that with higher nonlinear coefficients or by using quasi-phase-matching, practical devices might be possible. Helmfrid et al also describe using their device to convert a signal wavelength to an idler wavelength. Yoo et al, in U.S. Pat. Nos. 5,825,517 and 5,434,700, demonstrate a device following the teachings of Helmfrid, using semiconductor quasi-phase matched material. This device had higher nonlinear coefficients and used quasi-phase matching yet did not produce significant optical signal amplification. The device is nevertheless useful in generating an idler frequency where the half-value of the pumping frequency falls between the idler and the signal frequencies (difference frequency generation). Yoo et al employ such a device as an optical interface between two WDM network loops. The later work by Yoo et al has applied difference frequency generation to WDM systems, including employing these devices as crossconnects between different WDM systems by adding optical switches.

M. H. Chou et al. (M. Fejer group), in "1.5-$\mu$m-band wavelength conversion based on difference-frequency generation in LiNbO$_3$ waveguides with integrated coupling structures", Optics Letters, Vol 23, No. 13 (1998) have disclosed difference frequency generation in waveguides of quasi-phase matched lithium niobate. The use of such devices for broadcasting a signal by converting one input wavelength to two different wavelengths has been demonstrated.

In spite of using higher nonlinearities and quasi-phase-matching, none of the aforementioned art has demonstrated amplification of the signal such that the resulting device can be used as a practical amplifier.

In this disclosure, the inventors describe how to obtain sufficient gain to make a practical OPA amplifier for telecommunications systems, as well as novel devices which can be implemented with the disclosed amplifier. Through proper design of the waveguide, a gain sufficient for optical telecommunications use may be obtained, while at the same time, the pumping requirements may be maintained sufficiently low, so as to be satisfied by readily available pump sources. A practical implementation of the use of a pulsed pump and intracavity pumping is also described. As used in this disclosure, the terms "sufficient gain", "practical amplifier" and the like envision amplifier gains of at least around 3 dB.

The patents and publications discussed in the foregoing and hereinafter are hereby incorporated by reference herein.

SUMMARY OF THE INVENTION

It is a general object of the present invention to extend the number of WDM channels achievable in fiber-optic communication systems by enabling optical amplification at any wavelength within the complete spectral region of minimum optical loss of the optical fiber.

It is another object of the present invention to further increase the bit-rate of data transmission and to decrease the cost of communication systems by combining optical amplification and group-velocity dispersion compensation in the same device.

It is a still further object of the present invention to provide wavelength switching in WDM systems, which can be implemented in the same device as the optical amplification and GVD compensation.

Yet another object of the present invention is to provide optical data transmission at any wavelength within the complete spectral region of minimum loss in a fiber.

According to the present invention, these objects are achieved by employing three-wave optical parametric amplification in a nonlinear optical medium with a gain which is sufficiently high for fiber-optic communication systems, using acceptably low pump powers in the milliwatt to several watt range.

The above and still further objects, features and advantages of the present invention will become apparent upon consideration of the following detailed description of specific embodiments thereof.

DETAILED DESCRIPTION OF THE PREFERRED EMBODIMENTS

Figure 3:
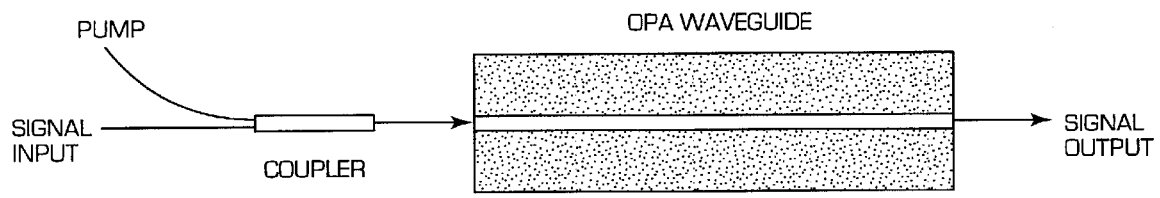
FIG. 3 illustrates a first, general embodiment of the present invention.

A first, general embodiment of the present invention is shown in FIG. 3, and is comprised of a waveguide fabricated in a nonlinear material with beam-combining optics. The beam combining optics, in which pump and signal beams are overlapped before injecting them into the waveguide, preferably comprises a fiber-optic coupler, but bulk components can also be used, such as a dichroic mirror or a thin-film polarizer. Alternatively, the pump and signal beams may be combined internally in the waveguide structure itself. In this case, the pump and signal beams are injected into two separate input waveguides and further combined into one waveguide using a waveguide coupler known in the prior art.

In order to demonstrate how this embodiment achieves all the objectives of the present invention, it is necessary to consider the general properties of three-wave optical parametric amplification.

In optical three-wave parametric amplification, a photon from the strong pump field $I_p$ is converted through nonlinear interaction into two photons, one in the signal $I_s$ and another in the idler $I_s$ fields. The optical frequencies ω of the pump (the shortest-wavelength wave), and the so-called signal and idler (the longest-wavelength wave) waves obey the following energy conservation equation:

$$\omega_p = \omega_s + \omega_i \quad (1)$$

Obviously, the necessary condition here is the presence of a nonlinear medium, which mediates this power transfer from the pump to the signal and the idler fields.

The important consequence of equation (1) is that for the optical signal amplified at either of the $\omega_s$ or $\omega_i$ frequencies, a phase-conjugate copy is also generated at the corresponding frequencies of $\omega_i$ or $\omega_s$. At any given time instant, phases $\phi$ the pump, and the generated signal and idler waves are related to each other:

$$\phi_p = \phi_s + \phi_i \quad (2)$$

Consequently, for pulsed optical waves, frequency chirps $\delta\omega$ of all three interacting waves obey the following equation:

$$\eta\phi_p = \eta\phi_s + \eta\phi_i \quad (30)$$

Which particular signal and idler photon frequencies are generated for a given pump frequency are determined by the phase-matching condition (momentum conservation condition) in the nonlinear medium.

$$k_p = k_s + k_i \quad (4)$$

Here $k_j = \omega_j n_j / c$ is the wavevector (momentum), $\omega_j$ is the optical frequency and $n_j$ is the material refractive index (or waveguide effective refractive index) of the j-th wave. c is the velocity of light in the free space.

The birefringence of the nonlinear medium can be exploited to achieve this phase matching by selecting a certain propagation direction and by choosing interacting waves of different polarizations. The more advantageous approach is to use quasi-phase-matching, where the phase matching condition can be achieved by periodic modulation of the non-linearity of the medium. The period $\Lambda$ of this modulation is chosen according to the equation:

$$\Lambda = \frac{2\pi}{k_p - k_s - k_i}. \quad (5)$$

This modulation of optical nonlinearity can be achieved in ferroelectric materials by periodic inversion of the ferroelectric domains. Such domain inversion has been achieved by using electric-field poling or ion-indiffusion techniques in $LiNbO_3$ and other ferroelectric materials, such as $LiTaO_3$, KTP, CTA and RTA. As known in the prior art, the principal advantages of the quasi-phase-matching scheme are that it allows one to arbitrarily choose the interacting wavelengths by selecting a suitable modulation period $\Lambda$, and to exploit the highest nonlinearities available in the given ferroelectric material. Additionally, quasi-phase-matching can be also implemented in semiconductor materials, such as GaAs. The advantage here is even higher material nonlinearities, compared to ferroelectric electrically poled materials.

It is essential from a practical standpoint that high gain optical parametric amplification be accomplished using low pump powers. Firstly, the required pump powers should be compatible with diode-laser and fiber-laser based pump sources currently used in fiber communication systems. At present, rare-earth fiber amplifiers can provide 20 to 30 dB gain with only 10 to 100 mW of pump power from a diode laser. Higher powers can be also advantageously employed in current communication systems, using diode-pumped fiber amplifiers and lasers, which provide output powers of up to a few tens of watts. Secondly, and most importantly, pump powers used for optical parametric amplification should not cause optical damage and photorefractive effects in the nonlinear material.

Prior to the present invention, optical parametric amplifiers have been considered impractical for fiber optic communication systems owing to the need for unacceptably high pump powers. This is particularly true for bulk-crystal parametric amplifiers. For example, even for electric field poled lithium niobate, which possesses the highest nonlinearity available through quasi-phase-matching, $10^2$ to $10^4$ W of pump power is required to achieve 20 to 30 dB gain. Even the best reported waveguide implementations have required impractical pump powers from ~50 to 100 W to achieve 20 to 30 dB gain. Such powers exceed the relatively low thresholds for optical damage and photorefractive effects in an optical waveguide. Damage thresholds, as determined by the small cross-sectional area, material limitations and long interaction lengths characteristic to optical waveguides, are in the range from 1 to 10 W at best.

The inventors have demonstrated experimentally for the first time that this limitation on optical parametric amplification in an optical waveguide can be overcome, by the suitable choice of fabrication conditions, by the proper design of mode overlap and by the preferable use of pulsed pumping.

In order to provide significant gain in a waveguide at pump powers below the occurrence of optical and photorefractive damage, it is essential to achieve a sufficiently high nonlinearity of the waveguide structure. The effective nonlinearity $\eta$ of a waveguide determines the optical gain G of a high-gain parametric guided-wave amplifier:

$$G = \frac{1}{4}\exp(2\sqrt{\eta P_{pump}}) \quad (6)$$

Here $P_{pump}$ is the pump power and the effective nonlinearity $\eta = \eta_{norm} L^2$. The effective nonlinearity $\eta$ depends on the length L of the waveguide and on its particular design. This design is characterized by the normalized efficiency coefficient $\eta_{norm} = 8\pi^2 d_{eff}^2 / (n_p n_s n_i c \epsilon_0 \lambda_s \lambda_i A_{eff})$, where $d_{eff}$ is the nonlinearity coefficient of the waveguide material, $A_{eff}$ is the effective cross-sectional area of the waveguide, $n_p$, $n_s$, $n_i$, $\lambda_s$ and $\lambda_i$ are refractive indices and wavelengths of the corresponding interacting waves, c is the speed of light and $\epsilon_0$ is the dielectric constant.

Figure 4:
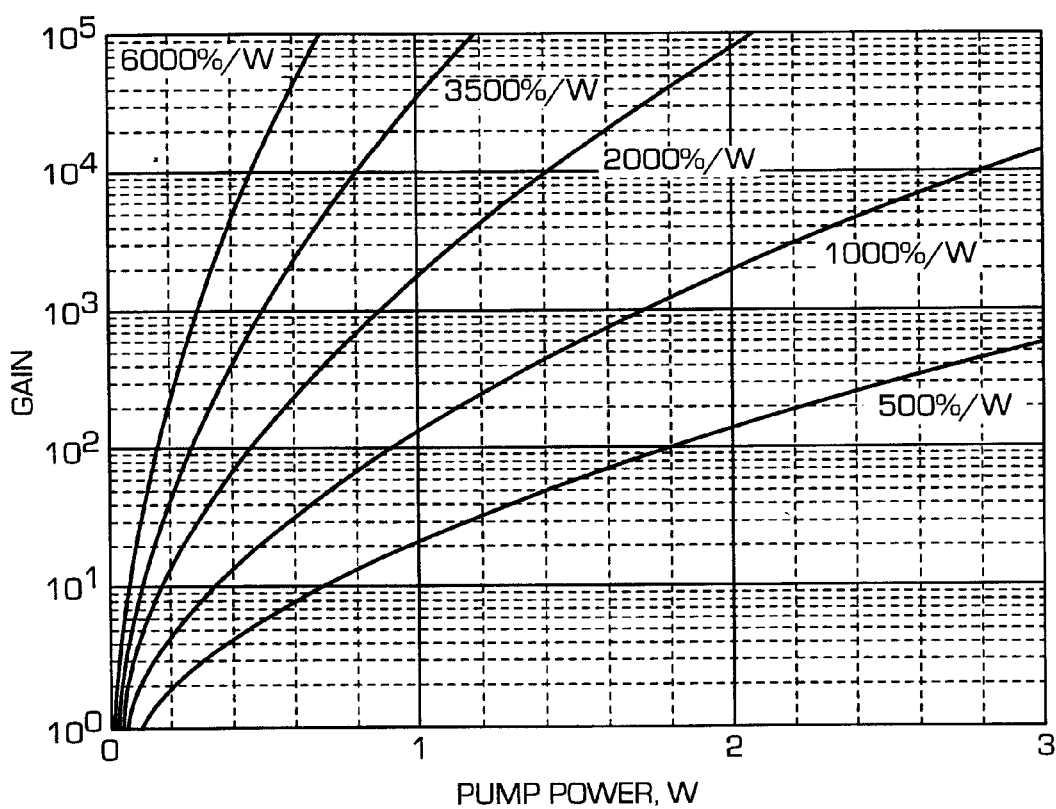
FIG. 4 is an illustrative plot of the calculated optical gain dependency on pump power for several η values.

As indicated by the illustrative plot of the calculated optical gain dependency on pump power for several $\eta$ values shown in FIG. 4, effective waveguide nonlinearities higher than approximately 500 to 2000%/W are required to achieve 20–30 dB gain with sub-watt to several-watt pump powers. For this degree of nonlinearity, the minimum gain factor of 3 dB is possible with pump powers below 100 mW.

Maximization of the waveguide nonlinearity is achievable by minimizing the effective cross-sectional area $A_{eff}$ and by maximizing the waveguide length L. This poses significant technological problems in the design and fabrication of the waveguide structures. Phase-matching conditions are very sensitive to the variation of waveguide parameters along the signal propagation path. Long waveguides with sufficient longitudinal homogeneity can be achieved only with tightly accurate control of the fabrication conditions. Minimization of the effective cross-section $A_{eff}$ is a complex task due to the necessity to achieve significant transversal overlap of the interacting pump, signal and idler modes, and due to the necessity of reducing the adverse effect of the degradation of material nonlinearity $d_{eff}$ during the waveguide fabrication process.

The inventors have achieved the required performance in proton-exchanged channel waveguides fabricated on three-inch z-cut electrically-poled LiNbO$_3$ substrate wafers of 0.5 mm thickness. The fabrication process for these devices is explained below.

The required PPLN patterns are formed on the wafer being processed, using established techniques. The inversion of one stable domain configuration to another is accomplished by applying a high voltage to the lithium niobate surfaces (i.e., the positive and the negative faces of the z-cut lithium niobate material). Typically the applied electric field is of the order of 21 kV/mm.

A diffusion barrier layer, typically of a metal (e.g., Al) or dielectric material, is then provided, based on the desired waveguide pattern, for use as a mask. This layer is deposited on the lithium niobate wafer by a known deposition process, and then a lift-off process is used to pattern the channel waveguide openings. A proton exchange process is subsequently effected at these openings as described subsequently. The channel waveguides have to be aligned accurately to ensure proper positioning of the channel waveguide with respect to the PPLN pattern.

The optical waveguides are then realized by performing proton exchange (PE) upon the exposed regions of the lithium niobate wafer using a weak protonic source such as molten benzoic acid. The typical range of exchange times is from 45 to around 60 minutes, at a temperature of around 200° C.

After the optical waveguides are formed, it is essential to anneal the wafer to enable the conversion of the waveguide region from a non electro-optic active phase back to its originally structural form. This is critical since the nonlinear characteristics of the material are dependent on the existence of the original phase of the lithium niobate material. The temperature for annealing can be in the range from 320 to 400° C. The annealing process may be carried out in multiple steps, with the first anneal performed for about 1 hour. The waveguide propagation characteristics are then measured using a commercially available prism coupler station. Further annealing is carried out for about 30 minutes and again the propagation characteristics of the waveguides are measured. At this point a determination is made as to whether further annealing is needed. If needed, another 20 to 30 minutes of annealing is carried out. The wafer with the waveguide channel PPLN devices are then ready for the remaining processing, which includes dicing and end-polishing of the devices.

A variety of waveguides with lengths ranging from 1 to 5 cm have been fabricated and characterized. Nonlinearity measurements have been performed using second-harmonic generation efficiency and optical parametric generation (OPG) threshold measurements in the fabricated optical waveguides. OPG occurs at optical parametric gain of ~90 dB, sufficient to produce optical signal at the output of a pumped amplifier without any external seed signal applied. The inventors have measured experimentally that $\eta_{norm.} \approx 100-150\%/W/cm_2$ have been achieved in the fabricated structures. For 4–5 cm long waveguides, this corresponds to an effective nonlinearity $\eta_{norm.} L^2$ of 1500–3000%/W, providing 90 dB gain with 7 to 10 W of peak pump power. As is clear from FIG. 4, pump powers of less than 2 W are sufficient to provide 20 to 30 dB gain.

According to the present invention, the cross-sectional spatial overlap between the pump and signal modes can be modified in order to achieve the maximum nonlinearity of the waveguide.

Figure 5:
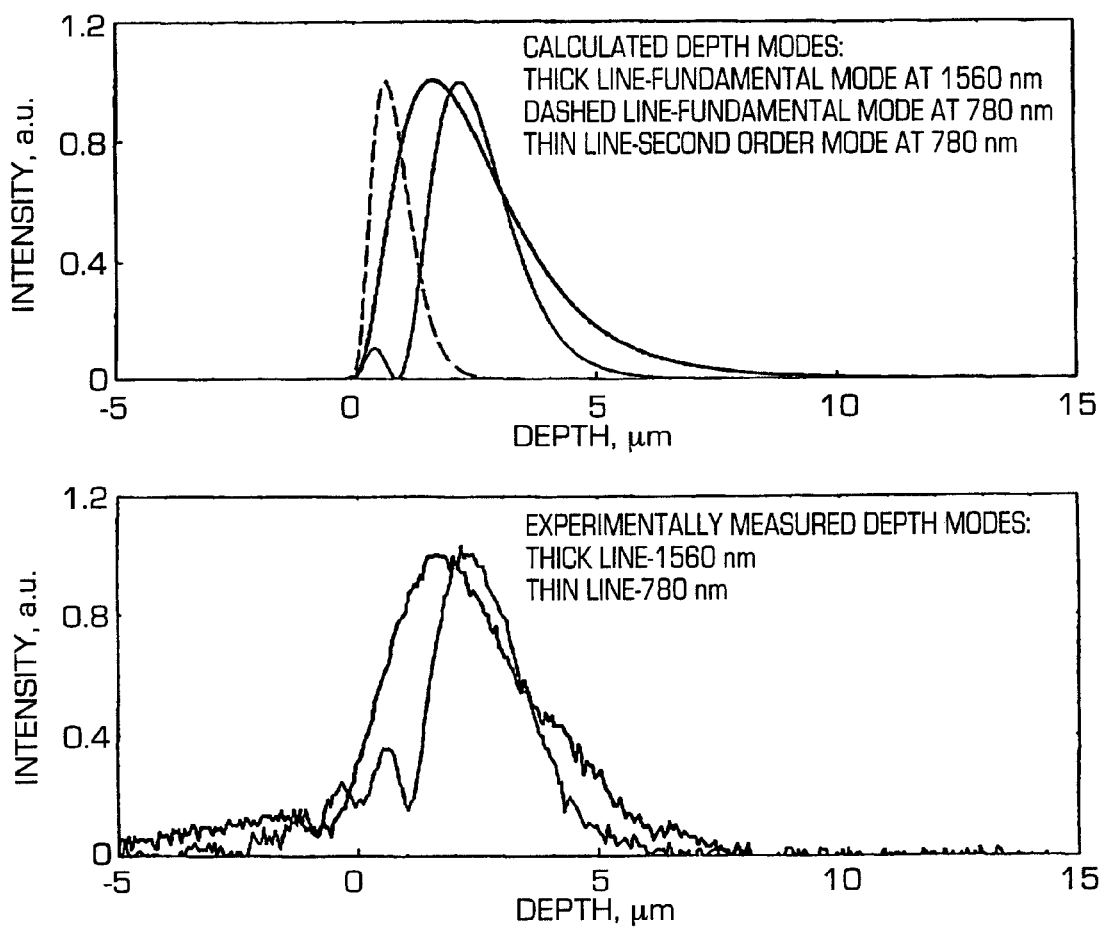
FIG. 5 shows calculated (top graph) and measured (lower graph) intensity distributions along the depth coordinate of the waveguide.

In the prior art, in order to maintain the diffraction-limited output from a waveguide, only fundamental modes of pump, signal and idler beams are allowed to propagate and interact. Since the interacting pump, signal and idler waves have very different wavelengths and the respective mode sizes are approximately proportional to these wavelengths, the resultant cross-sectional overlap integral and, consequently, the effective nonlinearity for a given interaction is significantly reduced. This is a particularly significant problem when 780 nm pumping is used for parametric amplification in the 1 to 3 μm spectral range. In FIG. 5 (top), calculated intensity distributions along the depth coordinate of the waveguide are shown for the fundamental modes at 780 nm (dashed line) and 1560 nm (thick line). Waveguide geometry and anneal parameters used in the calculations correspond to the range of fabrication conditions disclosed above. It is obvious that the 780 nm mode is significantly more shallow than the 1560 nm mode. Calculations for the degenerate parametric interaction between these fundamental modes yielded $\eta_{norm.} \approx 30-40\%/W/cm^2$.

According to the present invention, allowing higher-order pump modes to interact with fundamental signal and idler modes can significantly increase the effective nonlinearity. The thin-line curve in FIG. 5 (top) shows the calculated second-order 780 nm transversal mode profile in the annealed PE waveguide. Clearly, this second-order transversal mode at 780 nm has a significantly larger cross-sectional overlap with the fundamental mode at 1560 nm compared to the fundamental mode at 780 nm. Indeed, the calculated $\eta_{norm.} \approx 100-120\%/W/cm^2$ is about 3 to 4 times larger than the effective nonlinearity of the fundamental-mode interaction. It is also advantageous that this second-order mode is located deeper than 1 μm from the surface of the waveguide. As is known in the art, the nonlinear coefficient is significantly reduced in the top ~0.5 μm thick surface-layer of the guide due to the structural changes during the proton-exchange process. Conversely, it is clear (from FIG. 5), that a significant fraction of the fundamental short-wavelength mode is inside this "dead" layer.

Experimentally measured depth profiles for 780 nm and 1560 nm modes are shown at the bottom of FIG. 5, clearly indicating the presence of higher-order 780 nm mode. The effective normalized nonlinearity $\eta_{norm.}$ of this particular waveguide has been measured to be $\approx 100\%/W/cm^2$, close to the above given theoretically expected value for the interaction between higher-order pump and fundamental signal modes. Note, however, that the advantages of employing such higher-order mode interactions are general and are not limited to the specific geometries, fabrication parameters and wavelengths given above.

Figure 6:
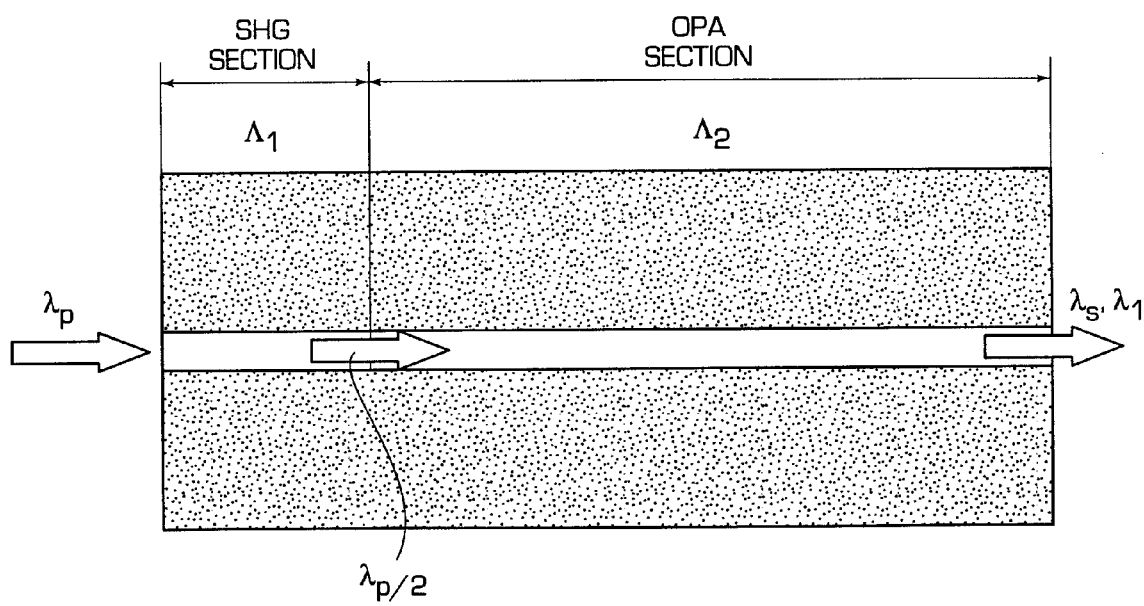
FIG. 6 illustrates the division of the waveguide into SHG and OPA sections.

This aspect of the present invention is implemented according to the embodiment in FIG. 6. The nonlinear substrate of the waveguide consists of two sections, characterized by two different periods Λ of the electrically-poled QPM domains. The wavelength of the pump beam at the input of the waveguide is selected so that $\lambda_p > \lambda_c$ and $\lambda_p/2 < \lambda_c$, where $\lambda_c$ is the cut-off wavelength for the fundamental mode. At $\lambda > \lambda_c$ the waveguide supports only a single, fundamental cross-sectional mode and for $\lambda_p > \lambda_c$ only a fundamental transversal pump mode can be injected into the waveguide. In the front section the wavelength of the pump $\lambda_p$ is converted to $\lambda_p/2$ through second-harmonic generation. Since $\lambda_p/2 < \lambda_c$, higher-order transversal modes can also propagate and, consequently, can be excited in the waveguide. According to the present invention each particular mode of any order (fundamental and higher-order) can be selectively excited at $\lambda_p/2$ by selecting a suitable period Λ, according to equation (5). This selective excitation is possible due to the fact that each of the transversal modes at $\lambda_p/2$ is characterized by a different value of the effective refractive index $n_{mode}$. Corresponding phase-matching conditions are arranged in the second electric-field poled section of the waveguide.

The phase matching period Λ can be selected according to eq. (5) to achieve parametric conversion from any selected transversal mode at $\lambda_p/2$ to the lowest-order transversal modes at $\lambda_p$ and $\lambda_i$ wavelengths. Obviously, the order of the selected transversal modes should be the same in the second-harmonic and parametric amplification sections. It is important to note that the general need for the second-harmonic section for obtaining $\lambda_p<\lambda_c$ arises due to the necessity of avoiding waveguide excitation at wavelengths below the cut-off wavelength. As known in the art, such excitation would cause unstable mode distribution in the waveguide, which would adversely affect the stability of the parametric amplification output.

Figure 7:
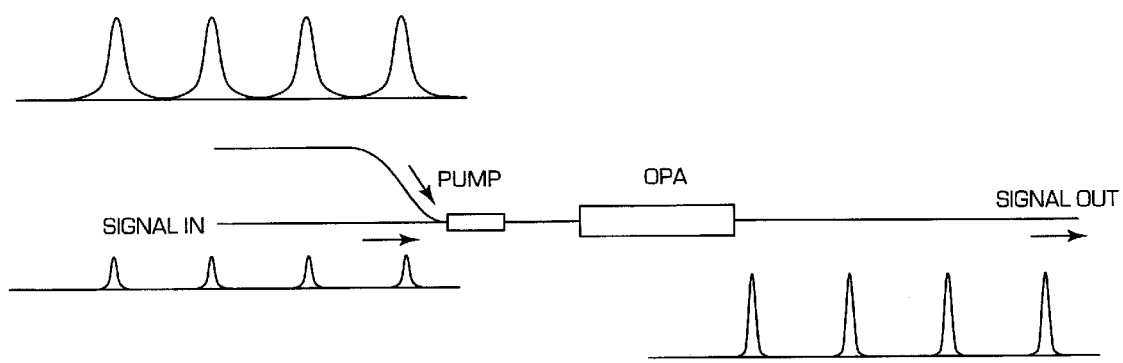
FIG. 7 shows an implementation of the present invention using pulsed pumping.

An advantageous mode of implementing the present invention is to use pulsed pumping as shown in FIG. 7. This allows reducing average pump power required for waveguide OPA, and, consequently, reducing any detrimental photorefractive effect in the optical waveguide. If the pump pulse duration is $\tau_{Pump}$ and the pulse repetition period is $T_{period}$, then the average pump power is reduced by $T_{period}/\tau_{Pump}$ compared to cw pumping. It is important to note that the pump pulse duration is preferably longer than the walk-off length between the pump and the amplified signal and idler pulses in the OPA waveguide. Obviously, both pump and signal pulses should be properly timed in order to ensure their temporal overlap in the OPA.

Figure 8:
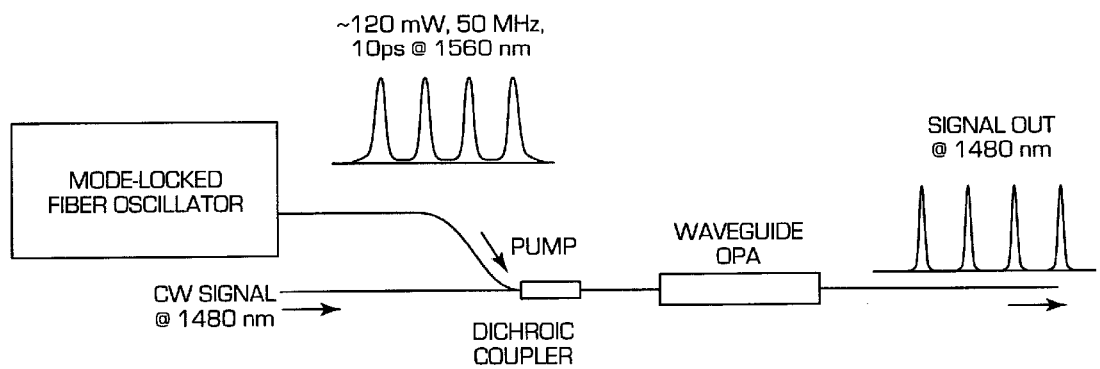
FIG. 8 illustrates a pulsed amplification embodiment according to the invention.
Figure 9:
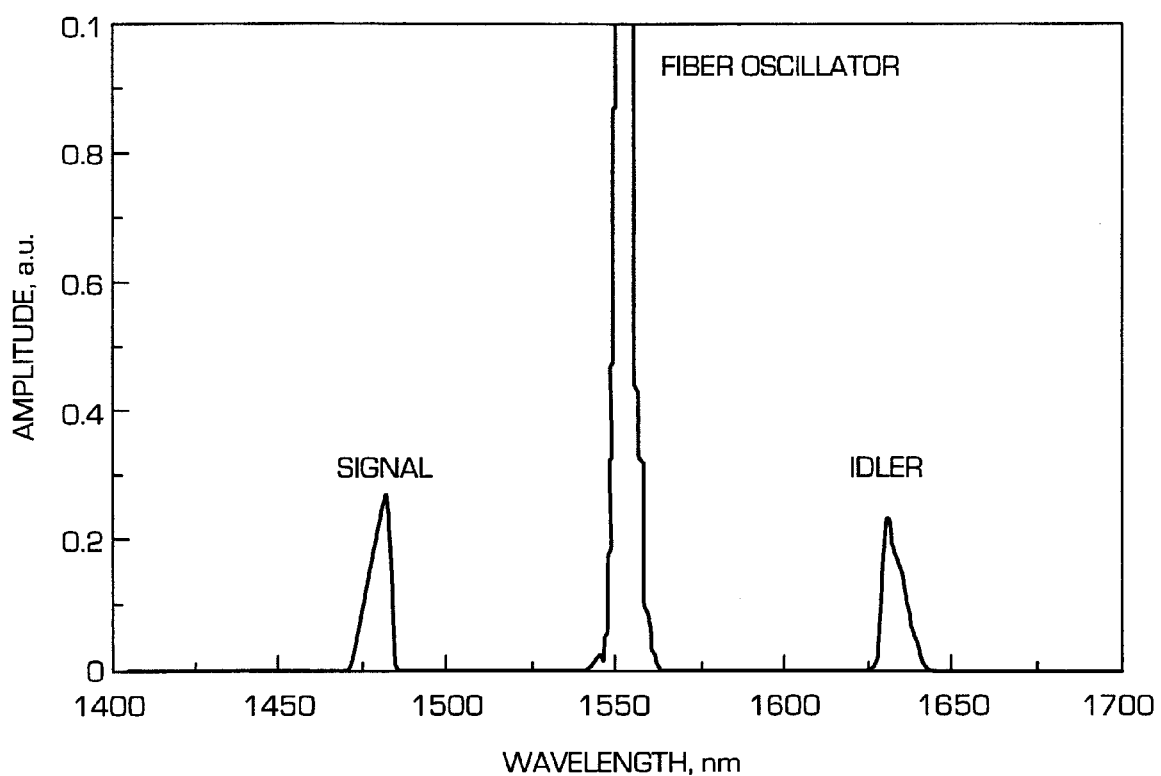
FIG. 9 shows the measured spectrum of an amplified signal at a wavelength of 1480 nm. along with signal and idler amplitudes.

A pulsed amplification embodiment is shown in FIG. 8. Pump pulses were produced by a mode locked Er-fiber oscillator, which provided 50 MHz 10 ps long optical pulses at ~1560 nm with pulse energies of up to 2.5 nJ. A cw seed signal at 1480 nm was combined with the pump beam using a dichroic coupler and then injected into the waveguide. Waveguide quasi-phase-matching periods were chosen in such a way that they provided simultaneous second-harmonic conversion of the pump beam from 1560 nm to 780 nm and the optical parametric amplification at 1480 nm using the generated 780 nm pump beam. The effective length of the waveguide was ~2 cm. The inventors have determined that ~45 dB gain is obtained at 1480 nm with 780 nm pump pulse energies of only ~100 pJ. The measured spectrum of the amplified 1480 nm signal is shown in FIG. 9. Also seen here is the generated idler at 1640 nm and the residual pump at ~1560 nm. These results indicate that amplification of a 1 to 10 GHz pulsed signal requires only 100 mw to 1 W of pulsed pump average-power in the waveguide.

The waveguides were tested at pump powers up to 1 W. No significant problems were observed due to optical damage or the photorefractive effect. This demonstrates that a practical OPA amplifier can be operated below optical and photorefractive damage thresholds with diode-pumped fiber-based pump sources.

An important consideration for using proton-exchanged waveguides for communication applications is that such device is polarization-sensitive. Only one polarization is guided in such a waveguide. In order to achieve polarization insensitivity one could exploit the high-gain property of the OPA. The input signal could be polarization-scrambled before launching into the waveguide, in order to produce unpolarized input beam. Then, only half of the signal power would be coupled into the OPA waveguide. In the unsaturated amplification mode this would correspond to an effective gain reduction of only 3 dB. Clearly, such reduction factor is negligible compared to 20 to 40 dB total gain achievable in the amplifier. Furthermore, when the amplifier is saturated, the effective gain reduction would be less than 3 dB. An alternative design of the polarization-insensitive OPA amplifier is also possible, in which the input signal beam could be polarization-split into two orthogonal polarizations, which subsequently could be separately amplified in two waveguides and finally recombined after exiting these amplifiers.

According to equations (1) and (5), the amplification wavelength (either for the signal or for the idler beams) in the present invention can be selected arbitrarily by selecting an appropriate quasi-phase-matching period Λ and pumping wavelength $\lambda_p$. If $\lambda_p>\lambda_c$ in the parametric amplification section (no SHG section is needed in the waveguide), then the required amplification channel can be selected directly by tuning the pump wavelength. It is preferable that the pump wavelength be in the wavelength range from 1 to 1.1 μm, which corresponds to the amplification band of Yb-doped fiber amplifiers. For most annealed proton-exchanged waveguides this wavelength range is above the fundamental-mode cut-off wavelength $\lambda_c$. Alternatively, if $\lambda_p<\lambda_c$ the second-harmonic section is necessary in front of the parametric amplification section (as discussed above). As known in the art, for $\lambda_p<\lambda_c$, specially designed tapered waveguides (e.g., segmented waveguides) can be used at the front section of a waveguide to avoid the excitation of multiple fundamental pump modes.

Figure 10:
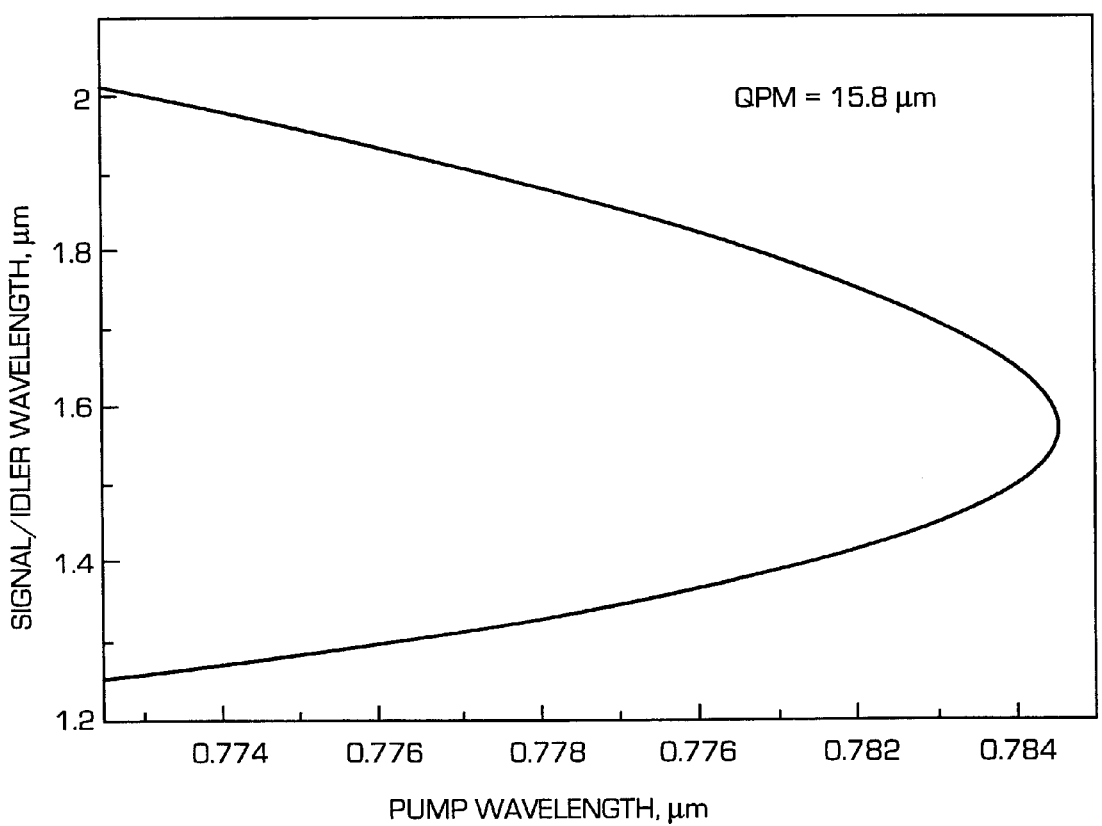
FIG. 10 illustrates how a small range of tuning is required at pump wavelengths in order to achieve significant tuning range at parametric amplification wavelengths.

In order to accommodate the tuning of the pump wavelength it is preferable to chirp the phase-matching period Λ of the second-harmonic section. Only a small range of tuning is required at pump wavelengths in order to achieve significant tuning range at parametric amplification wavelengths. This is demonstrated in FIG. 10, where only a 10 nm tuning range at $\lambda_p$≈780 nm is required to achieve amplification in the 1.2 μm to 2.2 μm spectral range. This small tuning range for the pumping wavelength allows efficient SHG conversion without resorting to long SHG section lengths. The practical significance of $\lambda_p>780$ nm is that it corresponds to the second-harmonic of ~1560 nm obtainable with Er-doped fiber amplifiers and lasers.

The amplification bandwidth Δλ is determined by the group-velocity mismatch between the signal and idler waves and by the interaction length L: $\Delta\lambda$ $1/(L(v_s^{-1}-v_i^{-1}))$. Comparison of this expression and equation (6) reveals that there is a trade-off between the amplification bandwidth and the nonlinearity of the waveguide: the nonlinearity of the waveguide increases with length when the bandwidth decreases. The inventors have found that the effect of this trade-off can be significantly reduced and broad amplification bandwidths can be still obtained with long waveguide devices. According to the present invention the group-velocity mismatch can be tailored by the suitable choice of the pump-beam wavelength and by tailoring the waveguide parameters.

Figure 11:
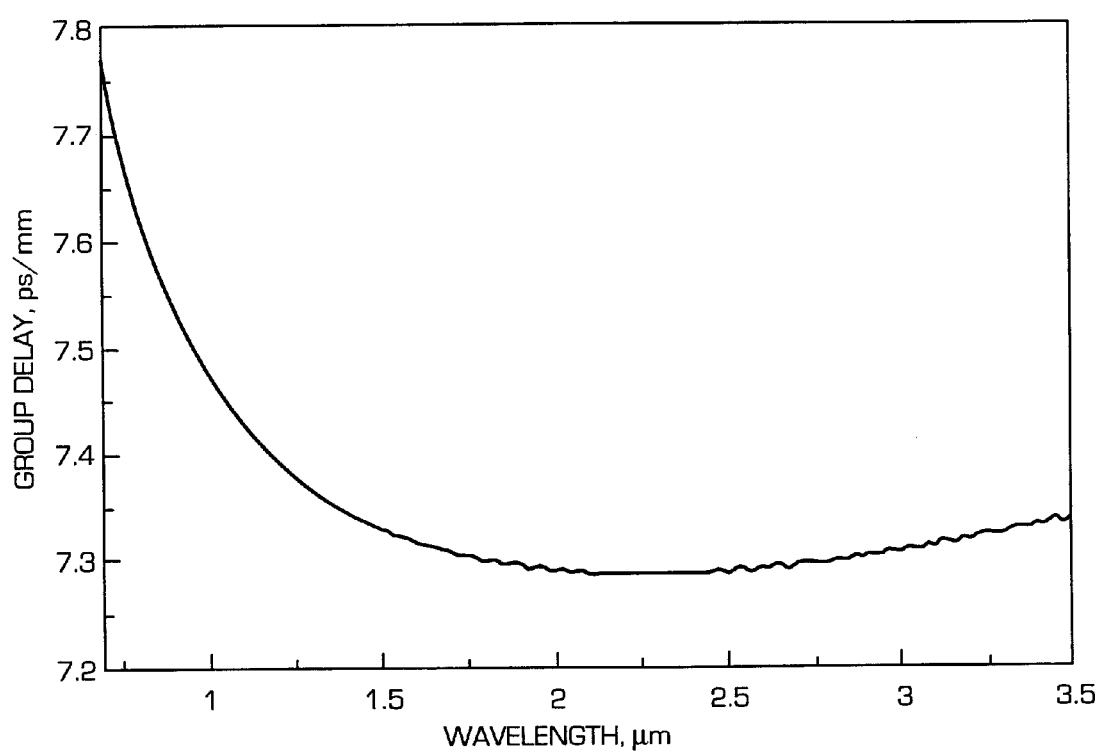
FIG. 11 illustrates the group-delay dependence upon wavelength for a waveguide fabricated according to the invention.

Generally, in any nonlinear material there is a spectral region at ~$\lambda_{min.}$ at which group-velocity mismatches for optical waves are close to zero. Consequently, for pump wavelengths at ~$\lambda_{min.}/2$ the group-velocity mismatch for signal and idler waves is significantly lower than for other pump wavelengths, thus leading to the increased gain bandwidth for such interaction. The shape of this group-velocity curve is characteristic to each particular nonlinear material. However, the presence of the waveguide generally modifies this shape. One representation of the group-delay $t_{group=L/vgr}$ dependence on the wavelength, measured in a waveguide fabricated according to the invention, is shown in FIG. 11.

Figure 12:
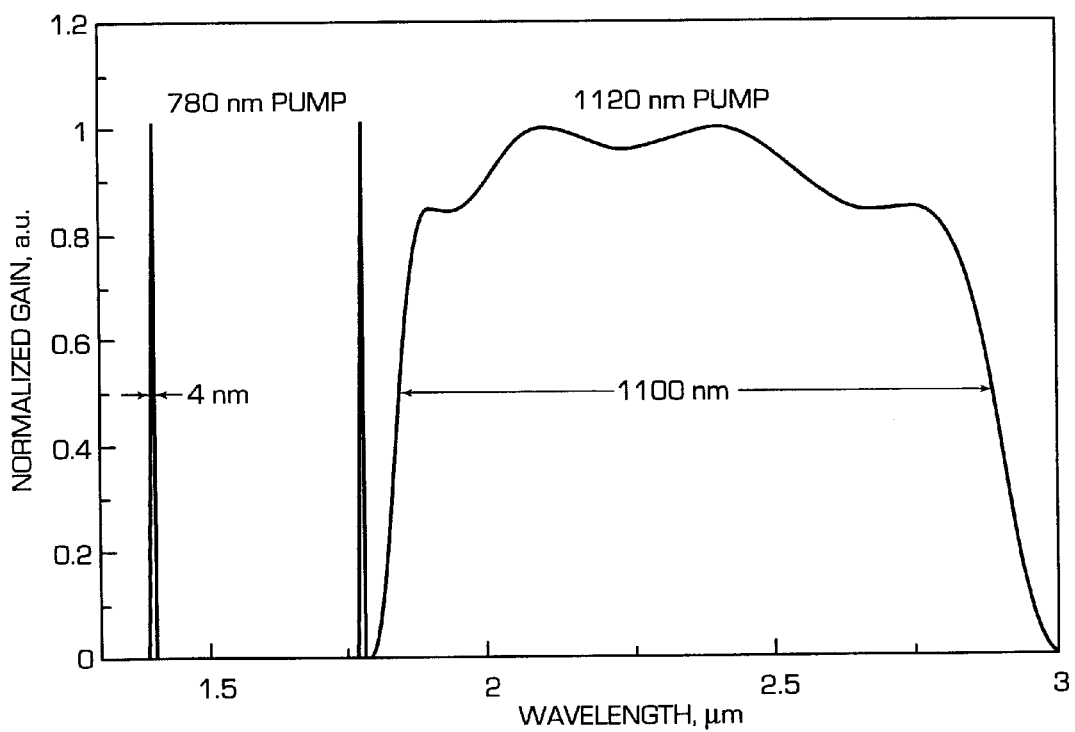
FIG. 12 shows calculated parametric gain spectra for 780 nm (thin line) and 1120 nm (thick line) pump wavelengths.

Clearly, in the spectral region from ~1900 nm to ~2900 nm the group-velocity mismatch is significantly smaller than at the other wavelengths. Calculated parametric gain spectra for 780 nm (thin line) and 1120 nm (thick line) pump wavelengths are shown in FIG. 12. Gain bandwidths for 780 nm pump at both the signal and the idler channels are only a few nanometers broad, consistent with experimental observations, while for 1120 nm pump the amplification spectrum is approximately 1100 nm broad. Modeling performed by the inventors shows that the exact spectral position and bandwidth of this broad gain spectrum is determined by the waveguide parameters and can be tailored towards shorter wavelengths by the proper choice of waveguide geometry and proton-exchange and anneal parameters during the waveguide fabrication process.

Of practical significance is the fact that high pump powers at 1000–1100 nm wavelengths are readily available from Yb-doped diode-pumped fiber amplifiers. These amplifiers are particularly attractive for use in optical communication systems due to exceptionally high pump-to-signal conversion efficiencies. Wall-plug to optical output efficiencies of about 30% have been achieved.

According to the present invention, wavelength-switching is an intrinsic property of the three-wave parametric amplification process. The parametric amplification of the optical wave at the signal wavelength always produces its wavelength-conjugate replica at the idler wavelength. Due to energy conservation (eq. (1)) the wavelengths of the pump, signal and idler waves obey the following equation:

$$\frac{1}{\lambda_P} = \frac{1}{\lambda_S} + \frac{1}{\lambda_i}. \quad (7)$$

In principle, for any given signal channel at $\lambda_s$ (or, alternatively, at $\lambda_i$) wavelength switching to any channel at $\lambda_i$ (or at $\lambda_s$, respectively) is achievable by choosing the appropriate pumping wavelength $\lambda_p$ (according to eq. (7)).

A limitation on the information-carrying capacity of any fiber based communication system arises from the group-velocity dispersion in the fiber. This dispersion causes the temporal distortion of the signal and, therefore, imposes a limitation on the communication-signal bandwidth which can be transmitted over a given distance. This traditionally has lead to the necessity of inserting compensation for the GVD dispersion at a number of points along the signal propagation path in a communication channel.

The GVD dispersion for each signal wavelength in a fiber is characterized by a dispersion parameter $D(\lambda)=-2\pi c/\lambda^2 \cdot d^2k/d\omega^2$. The temporal spread of a signal at the wavelength $\lambda$ and with the wavelength bandwidth $\Delta\lambda$ is $$\Delta\tau = -\Delta\lambda D(\lambda) L. \quad (8)$$

Here L is the signal propagation distance. Note that the wavelength spectrum of a signal is related to its frequency spectrum $\Delta\nu$ through $\Delta\nu=\Delta\lambda c/\lambda^2$.

According to the present invention, dispersion compensation can be obtained in the optical amplifier itself by exploiting the phase conservation property of the parametric three-wave interaction (equation (2)). One implementation of this aspect of the invention is to use unchirped pump signal (cw or pulsed). Then, according to eqs. (3) and (7), amplification of an optical wave in the signal channel produces the replica of this wave in the idler channel, which has the opposite frequency chirp with respect to the wave in the signal channel:

$$\delta\omega_s = -\delta\omega_i. \quad (9)$$

Figure 13:
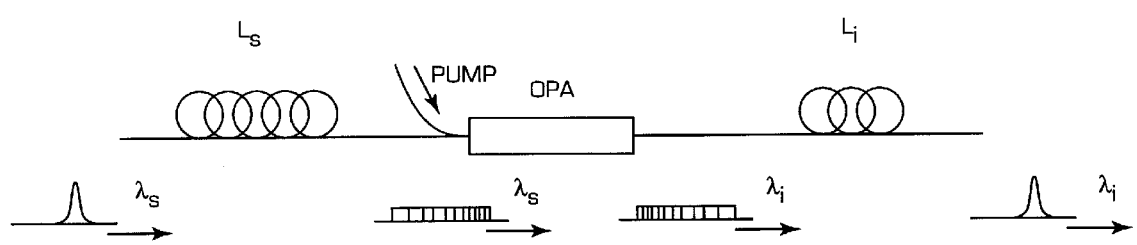
FIG. 13 illustrates an arrangement wherein dispersion compensation can be obtained in the optical amplifier using the phase conservation property of the parametric three-wave interaction.

An embodiment implementing this aspect of the invention is shown in FIG. 13. The communication signal at the signal channel wavelength $\lambda_p$ is propagated along a length $L_s$ of an optical fiber. This signal, which is temporally spread by dispersion according to eq. (7), is amplified and is wavelength-switched in the in-line OPA amplifier, as disclosed above, producing its wavelength conjugate replica at $\lambda_i$. It is necessary for this implementation of the invention that $D(\lambda_s)$ and $D(\lambda_i)$ are of the same sign at both signal and idler wavelengths. Note, however, that in general $D(\lambda)$ has different magnitudes at the signal and idler wavelengths. Since the frequency chirp at the idler wavelength is opposite to the dispersion-produced chirp at the signal wavelength, propagation of the idler signal a certain distance $L_i$ in an optical fiber will compress the signal to its initial duration. Using equations (8) and (9) this distance can be found as:

$$L_i = \frac{\lambda_S^2 D(\lambda_S)}{\lambda_i^2 D(\lambda_i)} L_S. \quad (10)$$

Figure 14:
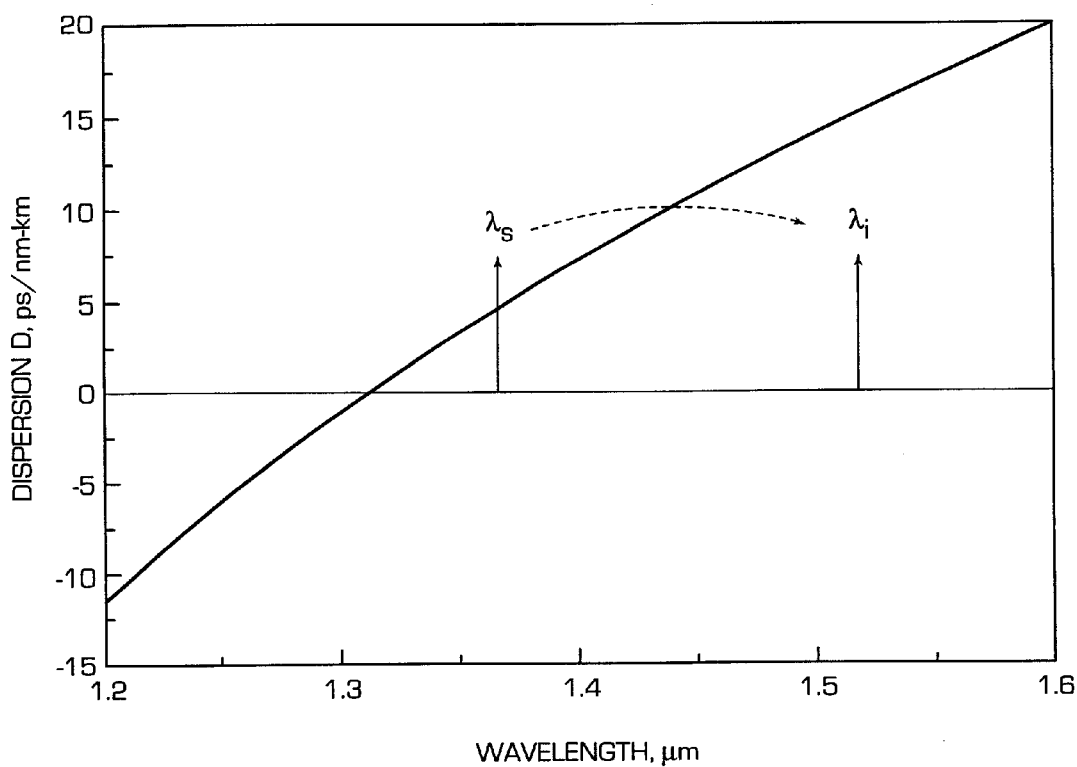
FIG. 14 illustrates the wavelength dependence of the dispersion parameter $D(\lambda)$ in a standard single-mode fiber; together with signal $\lambda s$ and idler $\lambda i$ wavelengths involved in the dispersion compensation.

In FIG. 14, the dependence of the dispersion parameter $D(\lambda)$ in a standard single-mode fiber (Corning SMF 28™) is shown. It is obvious that for signal and idler wavelengths longer than 1.3 µm the dispersion parameter remains positive and the above described method can be applied for dispersion compensation in existing communication lines.

Figure 15:
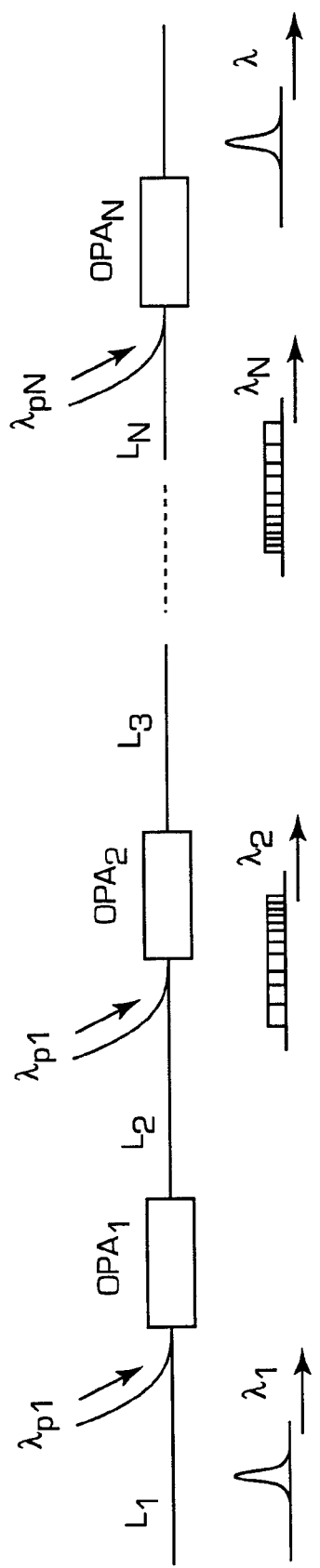
FIG. 15 illustarates how a transmission system can be designed to compensate GVD after each N amplification steps.

Furthermore, this technique can be used with any communication fiber dispersion profile. This is possible due to the fact that it is not necessary to compensate dispersion after each optical amplification step. The transmission system can be designed to compensate GVD after each N amplification steps, as shown in FIG. 15. This generally requires that N different pump wavelengths $\lambda_p$ should be selected at each amplification step so that the following condition after N amplification and propagation steps is fulfilled:

$$L_1\lambda_1^2 D(\lambda_1) + L_2\lambda_2^2 D(\lambda_2) + \ldots + L_{N+1}\lambda_{N+1}^2 D(\lambda_{N+1}) = 0. \quad (11)$$

Figure 16:
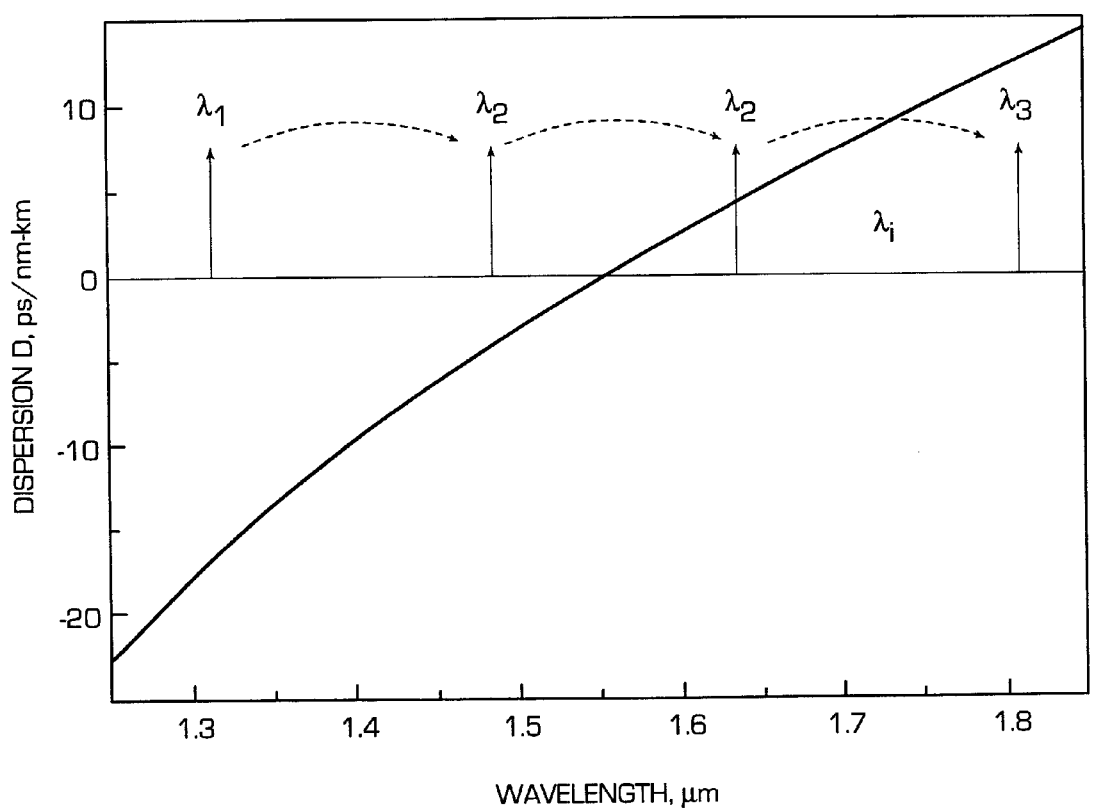
FIG. 16 shows the wavelength dependence of the dispersion parameter $D(\lambda)$ in a standard dispersion-shifted single-mode fiber, together with four signal $\lambda_s$ wavelengths involved in the signal transmission through three amplification steps.

One example is given in FIG. 16 where the dependence of the dispersion parameter $D(\lambda)$ in a standard dispersion-shifted single-mode fiber (Corning SMF/DSTM) is shown together with four signal $\lambda_s$ wavelengths involved in the signal transmission through three amplification steps. Since the fiber has a negative dispersion parameter $D(\lambda)$ for wavelengths below $\lambda_0 \approx 1550$ nm and positive dispersion above this level, proper pump wavelength and fiber length selection at each stage allows complete recompression at wavelength $\lambda 4$ after the fourth stage to be achieved.

The invention also enables achievement of additional dispersion compensation by using chirped pump pulses. If an optical signal pulse arrives at the OPA input with dispersion-produced chirp $\delta\omega_s$, then, according to eq. 3, the pump pulse with chirp $\delta\omega_p = -\delta\omega_s$ will generate an idler pulse with "compensated" chirp. Of course, this can be used in combination with the other above-disclosed dispersion compensation methods.

Figure 17:
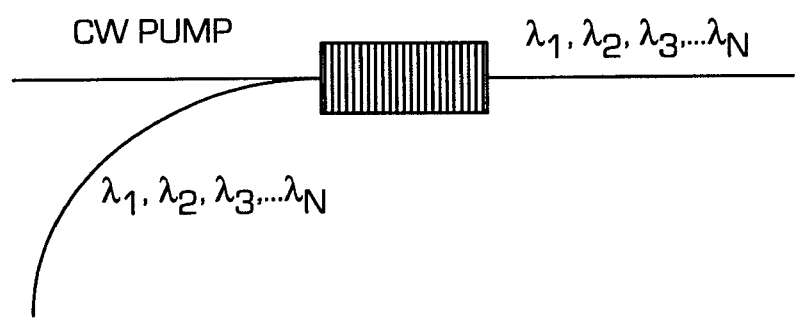
FIG. 17 shows the use of the invention in replacement of erbium fiber amplifiers in telecom networks.

Thus far there have been described novel optical parametric amplifiers directly applicable to telecommunications signal transport. The simplest system embodiment using these devices comprises cw pumping these amplifiers and using them in direct replacement of the existing erbium fiber amplifiers in the telecommunications system, as schematically illustrated in FIG. 17. The most important advantage obtained via this substitution is the ability to reach or utilize the entire wavelength region of interest for telecom. The simplest configuration is to amplify and transmit the signal source, leaving the idler to be used for other applications.

For example, along the telecommunication transport system, the signal often needs to be monitored to see if it must be routed off the system at this location. Given the conjugate relationship, the idler can be subjected to this monitoring, whereby the signal can be indirectly yet effectively monitored without the possibility of signal disturbance. An additional advantage of the optical parametric amplifier resides in that the gain can be unidirectional or bi-directional if the pump is in one or both directions, respectively. If there is gain in only one direction, backscattered light will not be amplified and cause excessive noise in the system. For signal amplification in the counter-propagating direction, optical parametric amplifiers with different gain peaks can be utilized.

Figure 18:
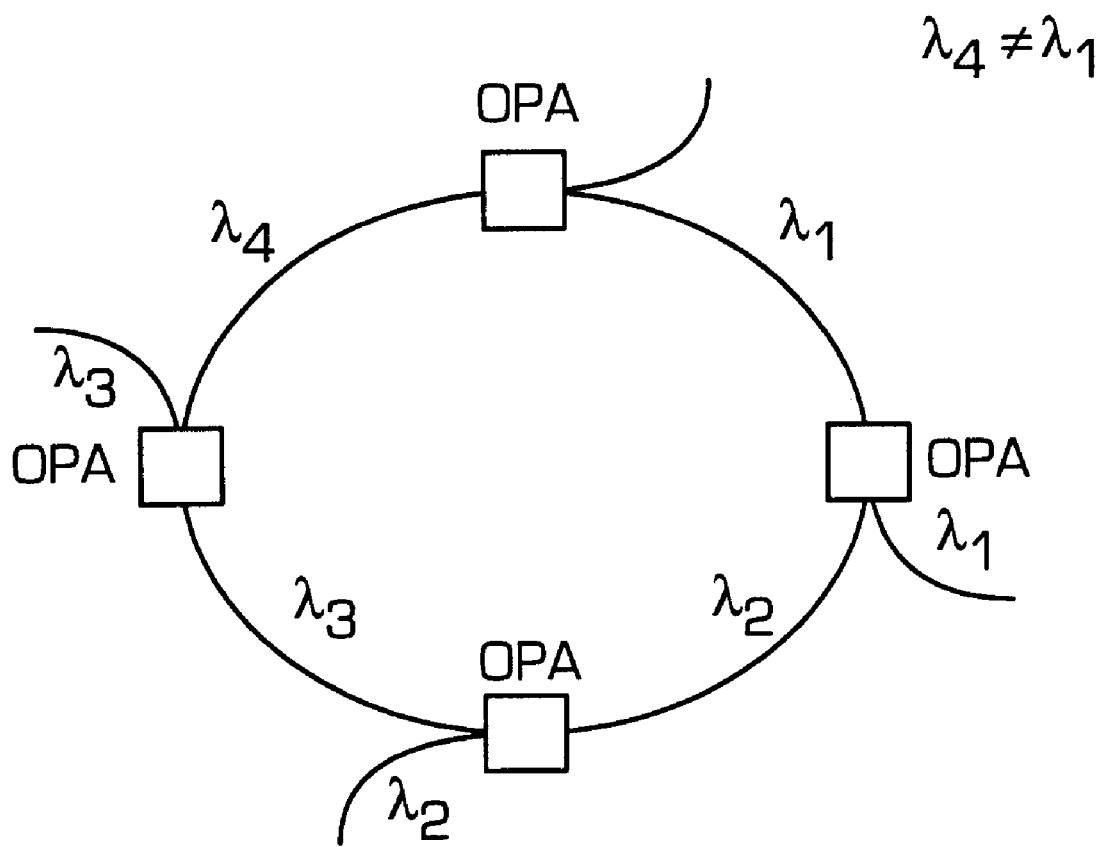
FIG. 18 illustrates a fiber ring network according to the invention.

Many telecommunications transport systems have a ring topology. The reason for the ring design is to provide fault tolerance. That is, if propagation in one direction is not possible because of a line cut or other fault, the signal can still get to its destination via the reverse path. A ring structure is shown in FIG. 18. A problem in present ring systems is the potential for lasing if the gains of the erbium amplifiers are not well balanced and the amplitude of the gains are not well controlled. This becomes a more serious problem if the connections between different ring networks become optically transparent. Transmitting the amplified idler instead of the signal can solve this problem by amplifying with different pump wavelengths at nodes around the ring; the signal and idler wavelengths do not have to be the same after one round trip. This concept is shown in FIG. 18.

Figure 19A:
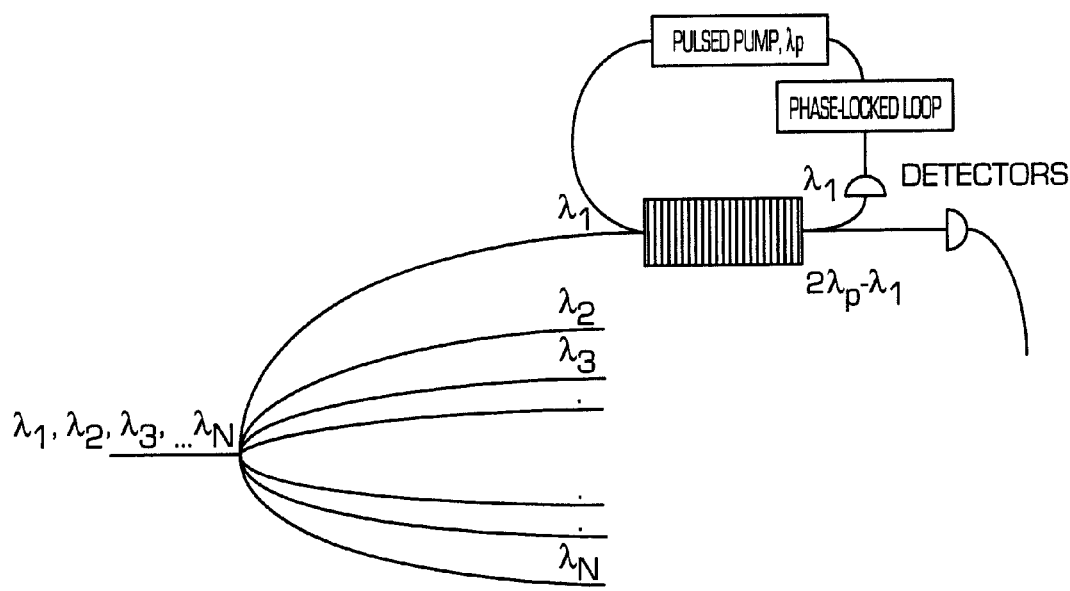
FIGS. 19(a) and (b) show embodiments of synchronized amplifiers where the pump source is timed to the incoming signal.
Figure 19B:
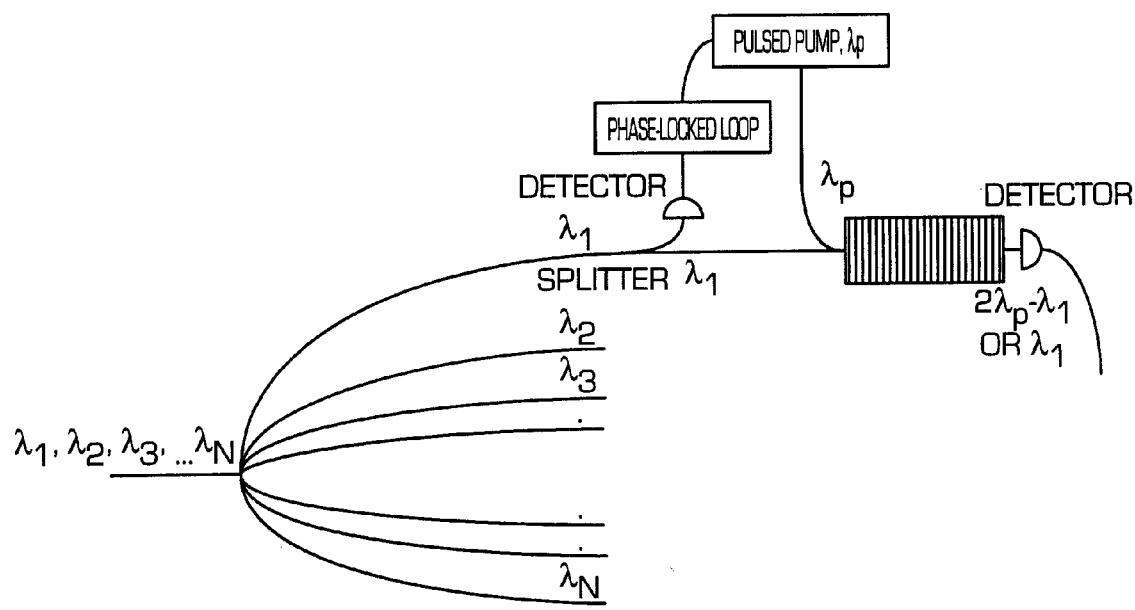

Another system embodiment is shown in FIGS. 19(a) and (b). Here, the optical parametric amplifiers are used within the telecommunications transport system as synchronized amplifiers, where the pump source is timed to the incoming signal. One of the more straightforward applications of the synchronized amplifier is as a preamplifier before detection; this being shown in FIGS. 19(a) and (b) (in two configurations) by way of illustrative example. The timing between the pump and signal can be performed in a number of ways that are conventional in the art. Shown here is a phase locked loop where a portion of the signal is used for timing. Signal to noise compared to a conventional erbium amplifier is improved in this case since the amplifier is being pulsed and the optical parametric amplifier can be designed to have a narrowband gain. This synchronized amplifier can also be used along the telecommunication transport system, since the amplifier can be designed to be of broader bandwidth to amplify a number of channels (however it requires the signals on the fiber to be synchronized). This will be the case, for example, if one broadband source is used for the pulse source rather than individual laser diodes for each wavelength in a WDM system.

In addition to those applications which are directly applicable to telecommunications signal transport, the optical parametric amplifiers of the invention can be used in many other system applications useful in the telecommunication area. A first such application is as a regenerator.

Figure 20:
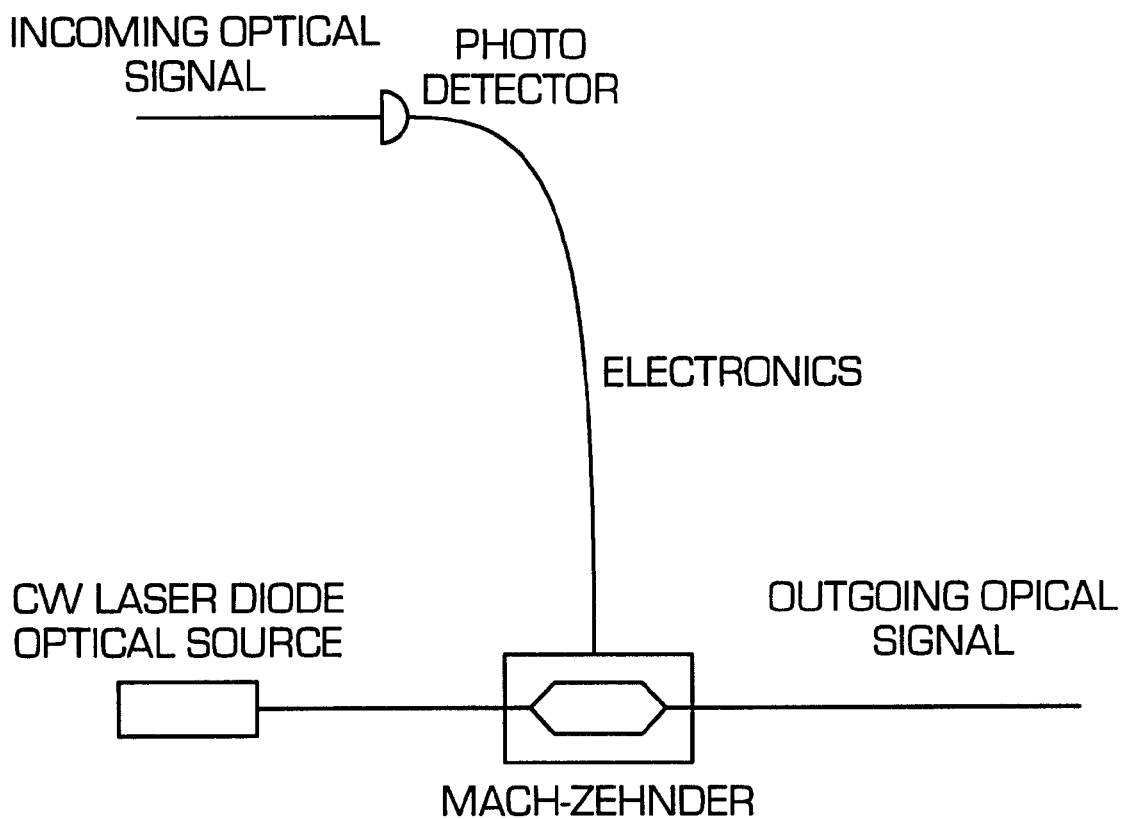
FIG. 20 illustrates an optical regenerator of conventional type.

Along a telecommunication transport system, often the signal to noise drops too low for the signal to be effectively restored by simple optical amplification, in which case the signal needs to be regenerated. The present art in regenerators is shown in FIG. 20. The regenerator includes a photodetector and associated electronics including electronic detection means, an amplifier and other components designed to reconstitute the original signal form, and an electro-optical converter for producing an optical signal from an electronic input. The optical source is typically a laser diode which is operated cw and the conversion element is a Mach-Zehnder switch. The Mach-Zehnder switch is an on-off switch which is used to impose the digital data onto the beam from the optical source.

Figure 21:
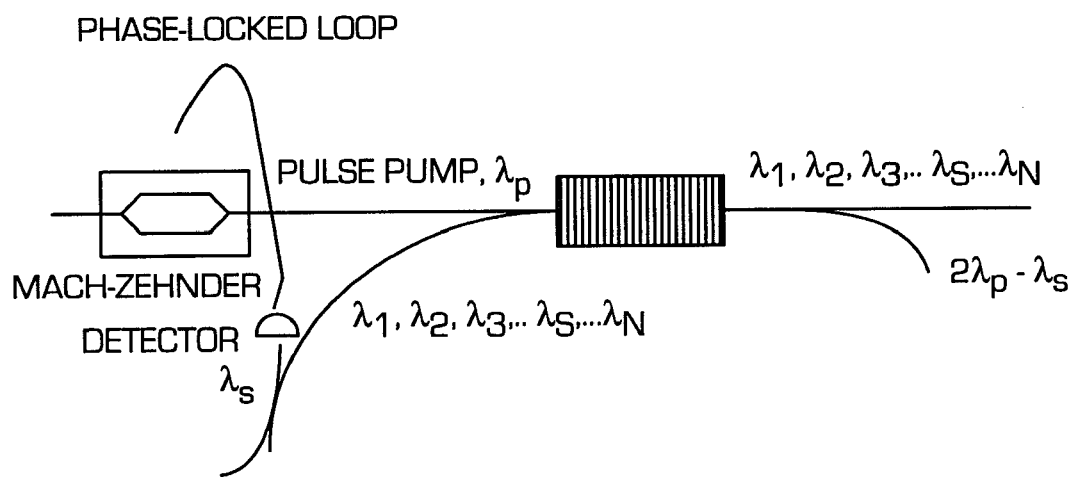
FIG. 21 illustrated an optical regenerator according to an embodiment of the invention.

It would be advantageous if the incoming optical signal did not have to be converted to an electrical signal and then reconverted into an optical signal; e.g., an all-optical regenerator would be desirable. FIG. 21 illustrates an optical parametric amplifier implementation of such an all-optical regenerator, for reconfiguring pulses in a fiber system. A portion of the signal is fed to a photodetector, which supplies the triggering signal to a Mach-Zender switch for suitably modulating (pulsing) the pump beam. The regenerator is also an amplifier, e.g., the amplification function previously performed electronically is now instead performed by the optical parametric amplifier. Since the device can have a narrow gain bandwidth, and is pulsed, it exhibits a very high noise reduction compared to known regenerators.

Figure 22:
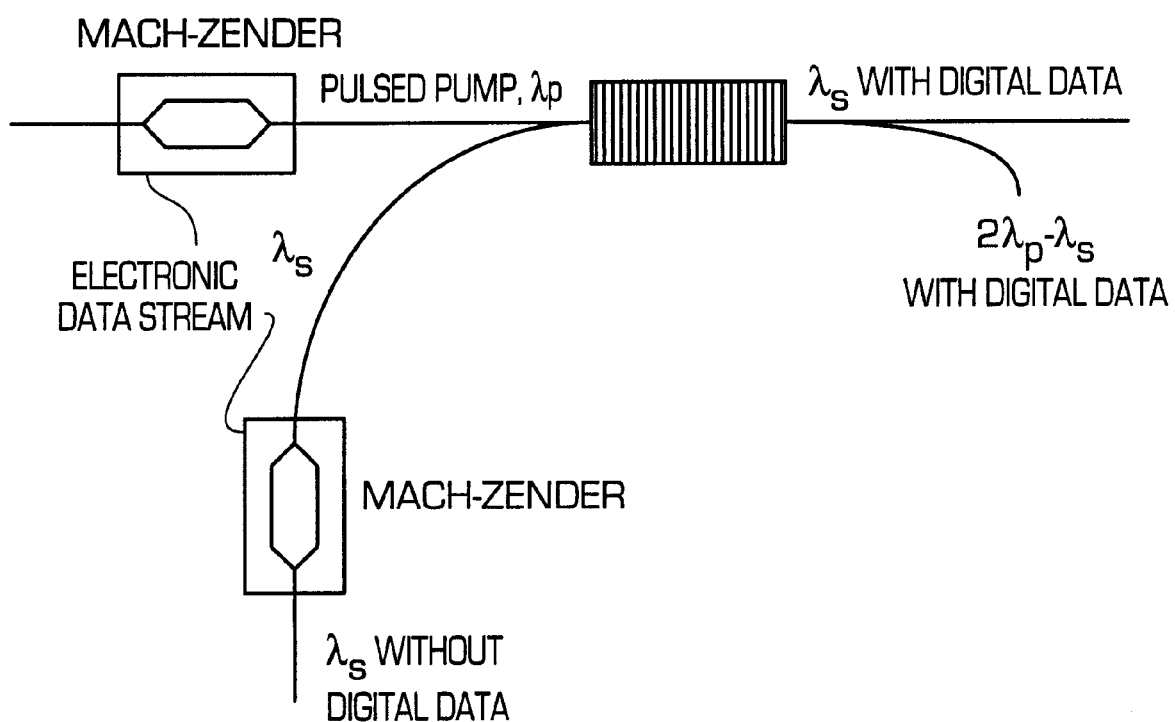
FIG. 22 shows the configuration of a high contrast optical switch according to the invention.

A typical optical switch, for example a Mach-Zehnder switch, has an on-off contrast ratio typically around 30 dB. Switches of higher contrast would be desirable in order to lower the build-up of noise in the system. The optical parametric amplifier of the invention can be configured as part of such a high contrast switch as shown in FIG. 22. The illustrated Mach-Zehnder switches have a 30-dB on-off contrast as noted. The optical parametric amplifier can have gains as high as 90 dB. The combination can yield a very high contrast switch (over 90 dB) which would be highly desirable and is presently unavailable.

Figure 23:
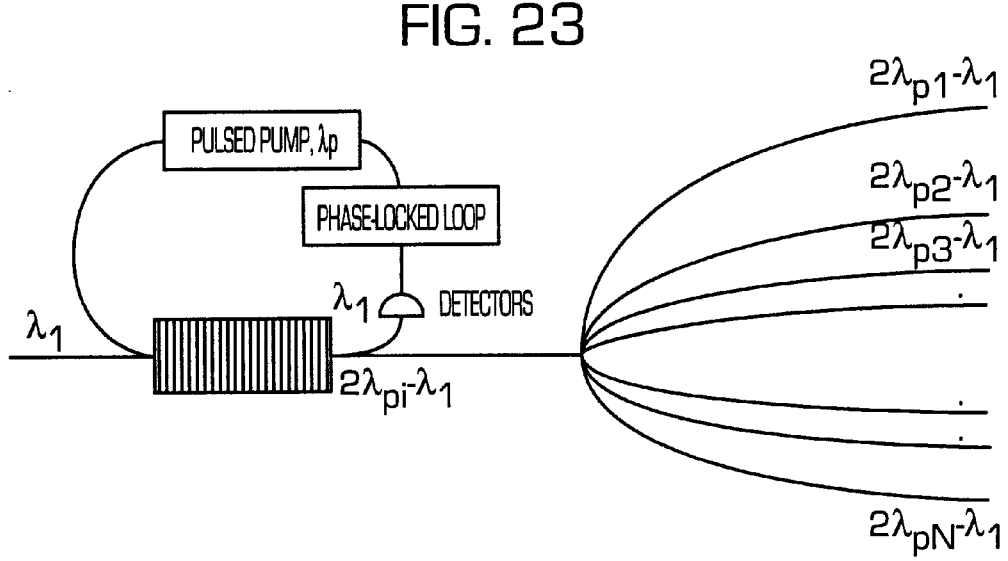
FIG. 23 illustrates an all optical router according to the invention.

If the ability to tune the pump laser is utilized, then the optical parametric amplifier can be used as a passive router as shown in FIG. 23. As disclosed above, by shifting the wavelength of the pump laser by 10 nm, the parametric amplifier can achieve amplification over a 1.2 to 2.2 micrometer spectral range. However, with only one input signal wavelength, in order to tune the idler, a change in the period of the quasi-phase matched material is necessary. One way of changing the period of the quasi-phase matched material is to have a chirp on the periods so that the needed periods are always present. The period of the quasi-phase-matched material can also be tuned with temperature, however this is a slow process. In each case, by tuning the pump, different wavelengths of idler can be generated as shown in FIG. 23. The idlers at different wavelengths can be routed to different fibers by having a wavelength router after the parametric amplifier as schematically indicated.

Figure 24:
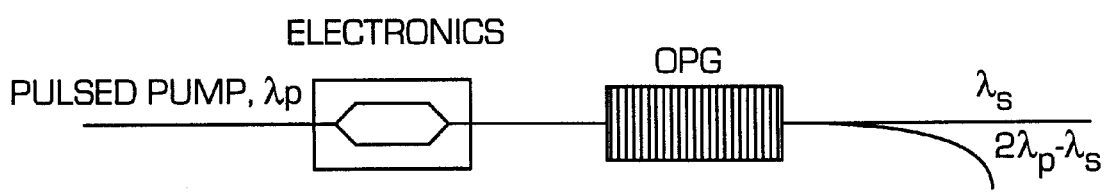
FIG. 24 illustrates an optical source which can reach the entire wavelength region of interest to telecom.

FIG. 24 illustrates an optical source which can reach the entire wavelength region of interest to telecom. If the optical parametric amplifier is pumped with a pulsed pump, the gains are sufficiently high (>90 dB, as demonstrated above) that the signal grows from noise. The bandwidth of the device is determined by the parameters of the quasi-phase-matched device. One means of reducing the bandwidth is to place an optical bandpass filter after the OPA, such as a fiber grating, and then amplifying the signal to higher energies in a second OPA. If the pump laser is modulated with a conventional Mach-Zehnder with a contrast of 30 dB, the gain will change by more than 90 dB. This source thus has an on-off ratio of >90 dB. Since conventional sources are cw laser diodes modulated with Mach-Zehnder switches with a contrast of 30 dB, this source has very high contrast compared to present sources.

Figure 1:
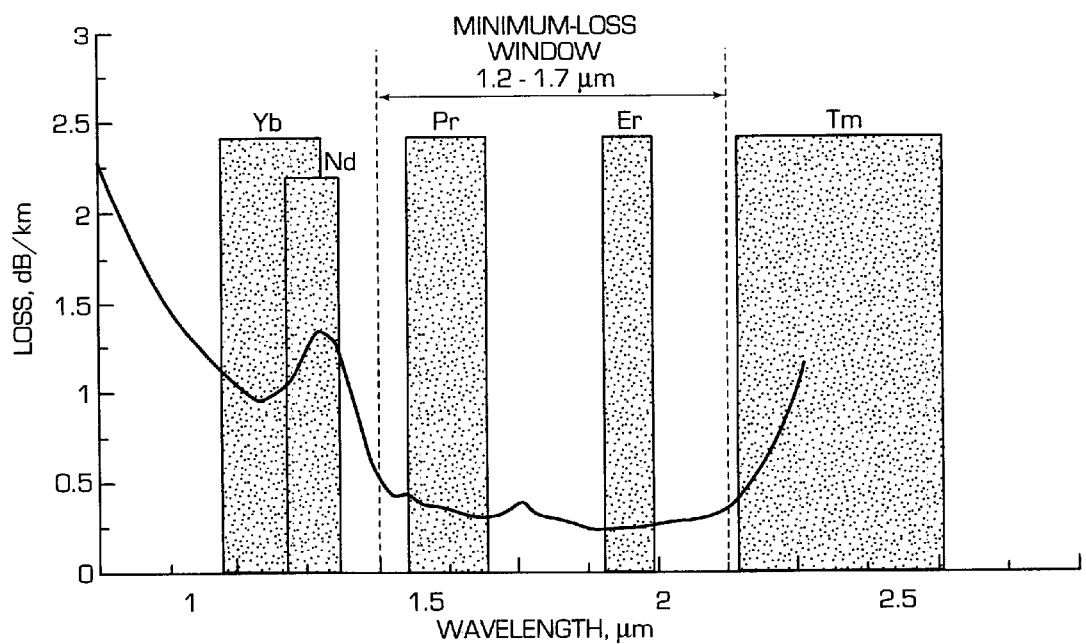
FIG. 1 illustrates the approximate wavelength bands of silica fibers and known fiber amplifiers.
Figure 2:
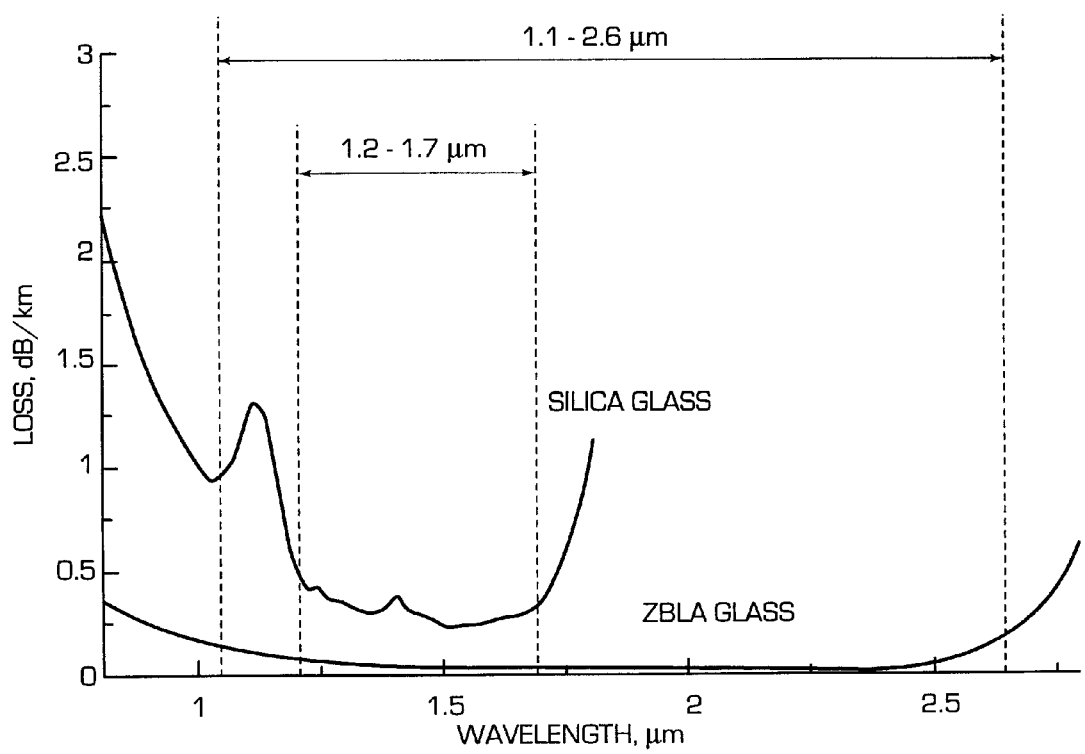
FIG. 2 illustrates optical losses and spectral bandwidths of several types of fibers.

A number of artisans in this field have realized that difference frequency mixing devices could be utilized as effective wavelength converters for optical cross-connects between networks. See for example FIG. 1 of U.S. Pat. No.

5,434,700. These devices are considered useful even when there is a greater than three order of magnitude reduction in amplitude between the incoming signal and the wavelength converted idler. See, generally, Xu et al., Appl. Phys. Lett., Vol 63, No. 26 (1993). However, in practical systems, the incoming signal would normally be at a minimum signal level when it arrived at the cross-connect, and thus would have to be amplified before conversion to maintain the signal to noise level of the system. After wavelength conversion, the idler would normally need to be propagated into the next network, so an additional amplifier would be necessary. The optical parametric amplifier of the invention is an ideal substitute for the prior arrangements, since it replaces two amplifiers and the wavelength converter with one device. Since there is gain, it is also possible that the signal wavelength is that which is sent to another network while the idler is kept propagating in the original network. In essence, the amplifiers shown in FIG. 18 can also be cross-connects to achieve this end. U.S. Pat. Nos. 5,786,916; 5,321,540 and 5,510,921 disclose conventional technology in this area.

By using the passive router configuration as shown in FIG. 23, more than two networks can be combined. The input wavelength can be from one network and the output wavelengths can be directed to a like number of further networks.

What is claimed is:

1. An optical parametric amplifier system, comprising:
   a first source providing a signal;
   a second source providing a tunable pump;
   a waveguide comprised of a nonlinear optical medium and receiving said signal and said pump; said waveguide supporting at least a higher-order mode and comprising an optical parametric amplifier having a gain of at least 3 dB and an amplification range of about 1.2 $\mu$m to 2.2 $\mu$m over a tuning range of said tunable pump.

2. An optical parametric amplifier system, comprising;
   a first source providing a signal;
   a second source providing a pump at a power level in a range from milliwatts to around 10 watts;
   a waveguide comprised of a nonlinear optical medium and receiving said signal and said pump; said waveguide supporting at least a higher-order mode and comprising an optical parametric amplifier having a gain of at least 3 dB.

3. An optical parametric amplifier system for use in a telecommunication system, comprising:
   a first source providing a signal;
   a second source providing a tunable pump;
   a waveguide comprised of a nonlinear optical medium and receiving said signal and said pump; said waveguide supporting at least a higher-order mode and comprising an optical parametric amplifier having a gain of at least 3 dB and an amplification range of about 1.2 $\mu$m to 2.2 $\mu$m over a tuning range of said tunable pump.

4. An optical parametric amplifier system for use in a telecommunications system, comprising:
   a first source providing a signal;
   a second source providing a pump;
   a waveguide comprised of a periodically poled nonlinear optical medium and receiving said signal and said pump; said waveguide supporting at least a higher-order mode and comprising an optical parametric amplifier having a gain of at least 3 dB.

5. An optical parametric amplifier system for use in a telecommunications system, comprising:
   a first source providing a signal;
   a second source providing a tunable pump;
   an optical parametric amplifier receiving said signal and said pump; said optical parametric amplifier comprising a waveguide supporting at least a higher-order mode and comprised of a nonlinear optical medium, said optical parametric amplifier having a gain of at least 3 dB and an amplification range of about 1.2 $\mu$m to 2.2 $\mu$m over a tuning range of said tunable pump.

6. An optical parametric amplifier system for use in a telecommunications system, comprising:
   a first source providing a signal;
   a second source providing a pump;
   an optical parametric amplifier receiving said signal and said pump; said optical parametric amplifier comprising a waveguide supporting at least a higher-order mode and comprised of a periodically poled nonlinear optical medium, said optical parametric amplifier having a gain of at least 3 dB.

7. An optical parametric amplifier system for use in a telecommunications system, comprising:
   a first source providing a signal;
   a second source providing a pump;
   an optical parametric amplifier receiving said signal and said pump; said optical parametric amplifier comprising a waveguide supporting at least a higher-order mode and comprised of a periodically poled nonlinear optical medium having a second harmonic generation section and a parametric amplification section, said optical parametric amplifier having a gain of at least 3 dB.

8. A telecommunications system, comprising;
   an optical fiber network comprised of at least one fiber loop;
   signal amplifiers located at desired points of said network; wherein at least a plurality of said signal amplifiers comprise optical parametric amplifiers including a waveguide supporting at least a higher-order mode and comprised of a periodically poled nonlinear optical medium and providing a gain of at least 3 dB.

9. An optical parametric amplifier, comprising;
   a waveguide formed of a nonlinear optical material, said nonlinear optical material having a first SHG section and a second OPA section, each section having a unique period of electrically-poled QPM domains;
   pump and signal beams overlappingly interacting in said waveguide, said waveguide supporting both fundamental and higher order modes of said pump beam;
   said waveguide providing at an output of said OPA section an output beam amplified by at least 3 dB.

10. An optical amplifier enabling optical amplification at any wavelength within the complete spectral region of minimum optical loss of a silica optical fiber, comprising:
    sources of pump and signal beams;
    a waveguide formed of a nonlinear optical material, said nonlinear optical material having electrically-poled QPM domains;
    said pump and signal beams overlappingly interacting in an OPA section of said waveguide in a manner providing a gain of at least 3 dB at an output of said waveguide; said waveguide compensating group velocity dispersion of the beam at said signal wavelength by producing an idler beam having equal and opposite chirp; and means enabling wavelength switching of an output of said waveguide by controlling a wavelength of said pump source.

11. An optical parametric amplifier system, comprising:

a first source providing a signal;

a second source providing a pump;

a waveguide comprised of a nonlinear optical medium and receiving said signal and said pump; said waveguide comprising an optical parametric amplifier having a gain of at least 20 dB at a pump power of less than 2W.

12. An optical parametric amplifier system, comprising:

a first source providing a signal;

a second source providing a pump;

a waveguide comprised of an optical medium exhibiting second-order nonlinearity and which receives said signal and said pump, said waveguide supporting at least a higher-order mode and comprising an optical parametric amplifier having a gain of at least 3 dB.

13. An optical parametric amplifier as claimed in claim 12, wherein the second-order nonlinearity of said optical medium is at least about $100\%/W/cm^2$.

14. An optical parametric amplifier system, comprising:

a first source providing a signal;

a second source providing a pump;

a waveguide comprised of a nonlinear optical medium and receiving said signal and said pump; said waveguide supporting at least a higher-order mode and comprising an optical parametric amplifier having a gain of at least 3 dB, said waveguide being multimode at the wavelength of said pump but not at the wavelength of said signal.

* * * * *